US012750696B2

(12) United States Patent
Li et al.

(10) Patent No.: US 12,750,696 B2
(45) Date of Patent: Sep. 29, 2026

(54) METHOD FOR MEASUREMENT HANDLING, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Haitao Li, Dongguan (CN); Yi Hu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 198 days.

(21) Appl. No.: 18/513,206

(22) Filed: Nov. 17, 2023

(65) Prior Publication Data

US 2024/0098524 A1 Mar. 21, 2024

Related U.S. Application Data

(63) Continuation of application No. PCT/CN2021/098136, filed on Jun. 3, 2021.

(51) Int. Cl.
*H04W 24/10* (2009.01)
*H04W 24/02* (2009.01)
*H04W 52/02* (2009.01)

(52) U.S. Cl.
CPC ........... *H04W 24/02* (2013.01); *H04W 24/10* (2013.01); *H04W 52/0212* (2013.01)

(58) Field of Classification Search
CPC . H04W 24/02; H04W 24/10; H04W 52/0212; H04W 48/16; H04W 52/0216; Y02D 30/70
See application file for complete search history.

(56) References Cited

U.S. PATENT DOCUMENTS

2022/0312243 A1* 9/2022 He ........................ H04W 24/08
2024/0172020 A1* 5/2024 Li ..................... H04W 36/0085

FOREIGN PATENT DOCUMENTS

CN 109309938 2/2019
CN 110958631 4/2020
(Continued)

OTHER PUBLICATIONS

Qualcomm Incorporated, "RRM measurement relaxation for stationary UEs," 3GPP TSG-RAN WG2 Meeting #113bis-e, R2-2102682, Apr. 2021.

(Continued)

*Primary Examiner* — Chuong A Ngo
(74) *Attorney, Agent, or Firm* — Hodgson Russ LLP

(57) ABSTRACT

Embodiments of the present disclosure provide a method and an apparatus for measurement handling and a storage medium. The method for measurement handling includes receiving a stationary criterion from a network device and performing a neighboring-cell measurement relaxation when a terminal device satisfies the stationary criterion. The measurement relaxation includes one of the following. Perform a neighboring-cell measurement according to a first duration requirement, where a duration contained in the first duration requirement is Ki times a duration contained in a second duration requirement, Ki is an integer greater than 3, and the second duration requirement is a duration requirement based on which the terminal device performs a neighboring-cell non-measurement relaxation. Perform the neighboring-cell measurement with a first interval, where the first interval is greater than 1 hour. Stop the neighboring-cell measurement.

19 Claims, 4 Drawing Sheets

(56) References Cited

FOREIGN PATENT DOCUMENTS

| | | | |
|---|---|---|---|
| CN | 111641962 | | 9/2020 |
| CN | 111787563 | | 10/2020 |
| EP | 3800933 | A1 | 4/2021 |

OTHER PUBLICATIONS

Futurewei, "Discussion on R17 stationarity criterion and not-at-cell-edge criterion for RedCap UEs," 3GPP TSG-RAN WG2 Meeting #114-e, R2-2105959, May 2021.
CATT, "Email discussion summary for RAN4#94e_#114_NR_UE pow_sav_RRM," 3GPP TSG-RAN WG4 Meeting #94bis-e, R4-2005397, Apr. 2020.
"3rd Generation Partnership Project; Technical Specification Group Radio Access Network; NR; User Equipment (UE) procedures in Idle mode and RRC Inactive state (Release 16)," 3GPP TS 38.304, Mar. 2021, v16.4.0.
EPO, Extended European Search Report for EP Application No. 21943549.2, May 27, 2024.
Intel Corporation, "Use cases target to extend paging DRX cycle and relax measurement for stationary devices," 3GPP TSG RAN WG2 Meeting #111-e, R2-2006748, Aug. 2020.
WIPO, International Search Report and Written Opinion for International Application No. PCT/CN2021/098136, Jan. 29, 2022.
ZTE Corporation, "Report from Break-out session on R17 NTN and REDCAP," 3GPP TSG-RAN WG2 Meeting #113bis electronic, R2-2104302, Apr. 2021.
Samsung, "Report of [AT114-e][111][RedCap] RRM relaxation criteria in idle/inactive" 3GPP TSG-RAN WG2 Meeting #114e, R2-2106531, Apr. 2021.
CNIPA, First Office Action issued in corresponding CN application No. 202180098078.X, Aug. 18, 2026.

* cited by examiner

METHOD FOR MEASUREMENT HANDLING, TERMINAL DEVICE, AND NETWORK DEVICE

CROSS-REFERENCE TO RELATED APPLICATION(S)

This application is a continuation of International Application No. PCT/CN2021/098136, filed Jun. 3, 2021, the entire disclosure of which is incorporated herein by reference.

TECHNICAL FIELD

Embodiments of this disclosure relate to the field of communications technology, and more particularly to a method for measurement handling, a terminal device, and a network device.

BACKGROUND

In a communication system, a terminal device can perform a cell measurement in many scenarios such as cell selection and cell reselection, including a measurement on a cell where the terminal device camps and a measurement on a neighboring cell. Generally, when the terminal device is in an idle state, an inactive state, or a connected state, the terminal device can continuously perform a measurement on a serving cell where the terminal device camps, but a measurement on a neighboring cell is subject to a relevant parameter(s) configured by a network. The terminal device can perform a measurement on a neighboring cell in the case where a relevant-parameter constraint condition is satisfied. With the development of communication technologies and the expansion of application scenarios, an increasing variety of terminal devices are introduced into the communication system. In some scenarios, reduced capability (RedCap) stationary terminal devices such as industrial wireless sensors and video monitors are introduced. These terminal devices share the common feature of being small in size, and thus power saving is an important technical indicator of these devices, especially for devices such as industrial wireless sensors.

SUMMARY

Embodiments of this disclosure provide a method for measurement handling, a terminal device, and a network device.

In a first aspect, the present disclosure provides a method for measurement handling. The method is applied in a terminal device and includes receiving a stationary criterion from a network device and performing a neighboring-cell measurement relaxation when the terminal device satisfies the stationary criterion. The measurement relaxation includes one of the following: performing a neighboring-cell measurement according to a first duration requirement, where a duration contained in the first duration requirement is Ki times a duration contained in a second duration requirement, Ki is an integer greater than 3, and the second duration requirement is a duration requirement based on which the terminal device performs a neighboring-cell non-measurement relaxation; performing the neighboring-cell measurement with a first interval, where the first interval is greater than 1 hour; and stopping the neighboring-cell measurement.

In a second aspect, the present disclosure provides a terminal device. The terminal device includes a transceiver, a processor coupled to the transceiver, and a memory storing a computer program. The computer program is executed by the processor to cause the terminal device to receive a stationary criterion from a network device and to perform a neighboring-cell measurement relaxation when the terminal device satisfies the stationary criterion. The measurement relaxation includes one of the following: performing a neighboring-cell measurement according to a first duration requirement, where a duration contained in the first duration requirement is Ki times a duration contained in a second duration requirement, Ki is an integer greater than 3, and the second duration requirement is a duration requirement based on which the terminal device performs a neighboring-cell non-measurement relaxation; performing the neighboring-cell measurement with a first interval, where the first interval is greater than 1 hour; and stopping the neighboring-cell measurement.

In a third aspect, the present disclosure provides a network device The network device includes a transceiver, a processor coupled to the transceiver, and a memory storing a computer program. The computer program is executed by the processor to cause the network device to send a stationary criterion to a terminal device. A neighboring-cell measurement relaxation is performed by the terminal device when the terminal device satisfies the stationary criterion. The measurement relaxation includes one of the following: performing a neighboring-cell measurement according to a first duration requirement, where a duration contained in the first duration requirement is Ki times a duration contained in a second duration requirement, Ki is an integer greater than 3, and the second duration requirement is a duration requirement based on which the terminal device performs a neighboring-cell non-measurement relaxation; performing the neighboring-cell measurement with a first interval, where the first interval is greater than 1 hour; and stopping the neighboring-cell measurement.

DETAILED DESCRIPTION

In order to make the objectives, technical solutions, and advantages of the present disclosure clearer, the embodiments of the present disclosure are further described in detail below with reference to the accompanying drawings.

The term "multiple" and "a plurality of" herein refers to two or more than two. The term "and/or" describes an association relationship between associated objects, and indicates that three kinds of relationships may exist, for example, A and/or B may indicate three cases: A exists separately, both A and B exist, and B exists separately. The character "/" generally indicates an "or" relationship between associated objects.

Figure 1:
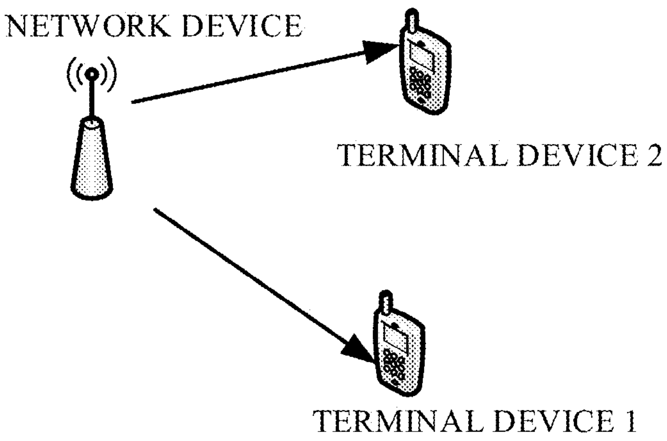
FIG. 1 is a schematic diagram of a network architecture provided in the disclosure.

Reference is made to FIG. 1, which is a schematic diagram of a network architecture to which an embodiment of the disclosure is applied. The network architecture illustrated in FIG. 1 includes a network device and a terminal device. There may be one or more network devices and one or more terminal devices.

It can be understood that embodiments of the present disclosure may be applied in various communication systems. The communication systems may include but are not limited to a long-term evolution (LTE) system, a new radio (NR) system, a future communication system (e.g. a future network, or a sixth-generation communication), and the like.

It can be understood that the number and forms of devices illustrated in FIG. 1 are examples, and do not construct a limitation on the embodiments of the present disclosure. For example, in a practical application, two or more network devices may be included.

In the embodiments of the present disclosure, a network device is deployed in a radio access network and can provide wireless communication functions for a terminal device. The network device may include various forms of macro stations, micro stations (also referred to as small stations), relay stations, access points, and so on. The network device may have different names in systems adopting different radio access technologies, for example may be called a base transceiver station (BTS) in a global system for mobile communication (GSM) or a code division multiple access (CDMA) network, a NodeB (NB) in a wideband code division multiple access (WCDMA), and an eNB or evolutional NodeB (eNodeB) in an LTE. The network device may also be a radio controller in a cloud radio access network (CRAN). The network device may also be a base station in a future fifth-generation (5G) network or a network device in a future-evolved public land mobile network (PLMN). The network device may also be a wearable device or an on-board device. The network device may also be a transmission and reception Point (TRP). The network device may also be a collective name of all devices at a network side, for example, in the case where multiple TRPs are configured to transmit data to a terminal device, the multiple TRPs are collectively referred to as a network device.

In the embodiments of the present disclosure, the terminal device may be a device having a wireless transceiving function, and may be deployed on land, including indoor or outdoor, handheld, wearable, or vehicle-mounted; may be deployed on water (such as on a ship); and may be deployed in the air (such as on an airplane, a balloon, and a satellite). The terminal device may be a mobile phone, a Pad, a computer with a wireless transceiving function, a virtual reality (VR) terminal device, an augmented reality (AR) terminal device, a wireless terminal in industrial control, a vehicle-mounted terminal device, a wireless terminal in self-driving, a wireless terminal in remote medical, a wireless terminal in smart grid, a wireless terminal in transportation safety, a wireless terminal in smart city, a wireless terminal in smart home, or a wearable terminal device, etc. There is no limitation on application scenarios in the embodiments of the disclosure. The terminal device may also be referred to as a terminal, a user equipment (UE), an access terminal device, a vehicle-mounted terminal, an industrial-control terminal, a UE unit, a UE station, a mobile station, a mobile platform, a remote station, a remote terminal device, a mobile device, a UE proxy, a UE device, or the like. The terminal device may be fixed or mobile.

The network architecture and service scenarios described in the embodiments of the present disclosure are for illustrating the technical solutions of the embodiments of the present disclosure more clearly, and do not construct a limitation on the technical solutions provided in the embodiments of the present disclosure. A person of ordinary skill in the art can know that, with the evolution of the network architecture and the emergence of new service scenarios, the technical solutions provided in the embodiments of the present disclosure are equally applicable to similar technical problems.

Based on the network architecture illustrated in FIG. 1, the method for measurement handling provided in the embodiments of the present disclosure is described in detail in the following. In the following illustration, names of information exchanged between the network device and the terminal device are taken as examples, which does not construct a limitation on the embodiments of the present disclosure.

Figure 2:
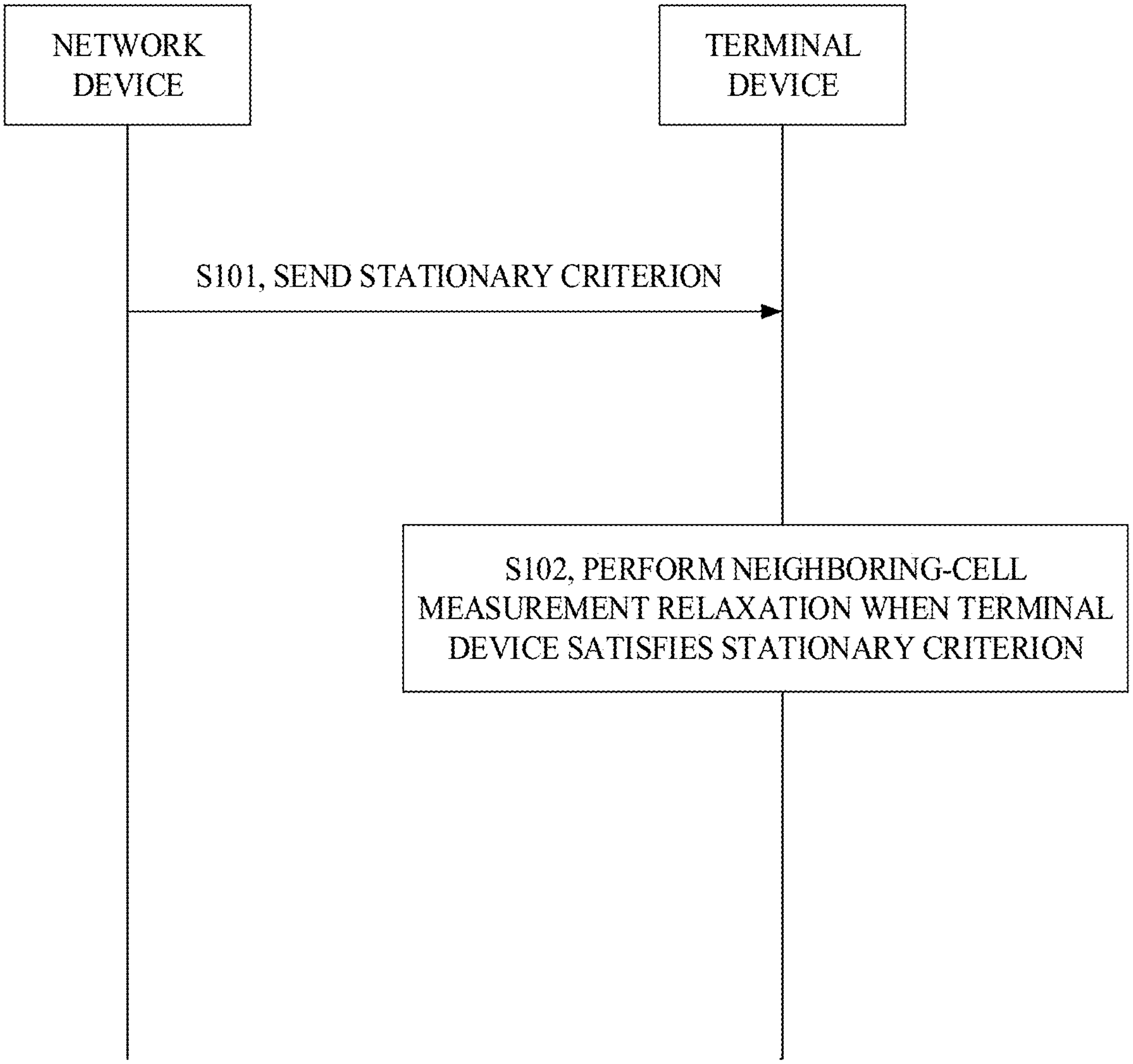
FIG. 2 is a schematic flow chart of a method for measurement handling provided in the disclosure.
Figure 3:
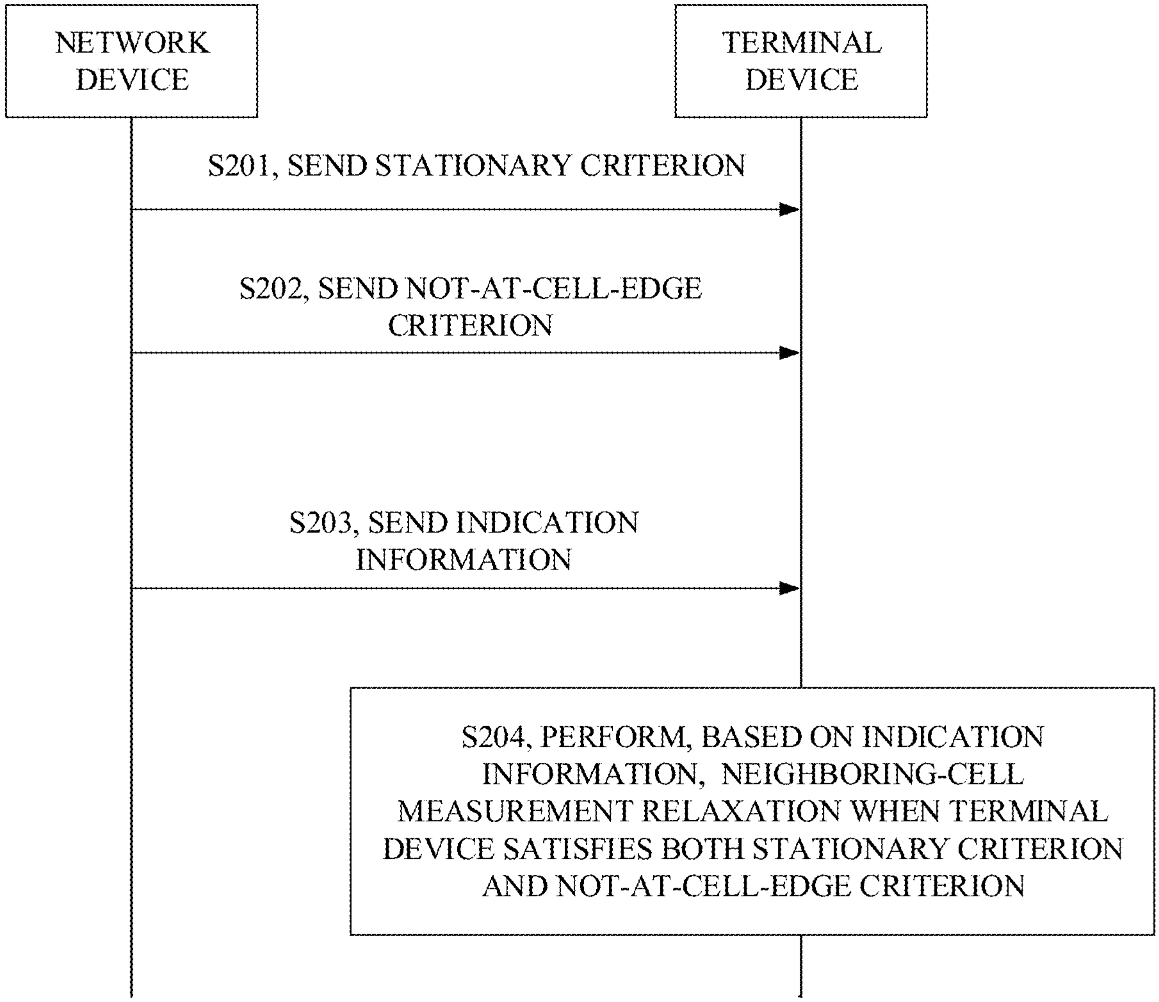
FIG. 3 is a schematic flow chart of another method for measurement handling provided in the disclosure.

Methods for measurement handling of the embodiments of the present disclosure are respectively described below with reference to FIG. 2 and FIG. 3. FIG. 2 illustrates that a network device may configure a stationary criterion for a terminal device, but does not configure indication information for the terminal device, and the terminal device performs a neighboring-cell measurement relaxation when the terminal device satisfies the stationary criterion. FIG. 3 illustrates that a network device may configure a stationary criterion, a not-at-cell-edge criterion, and indication information for a terminal device, and the terminal device performs a neighboring-cell measurement relaxation when the terminal device satisfies both the stationary criterion and the not-at-cell-edge criterion. Specific operations of the embodiments illustrated in FIG. 2 and FIG. 3 are respectively introduced below.

Reference is made to FIG. 2, which is a schematic flow chart of a method for measurement handling provided in the disclosure. FIG. 1 illustrates an exemplary network architecture to which the method for measurement handling is applied. As illustrated in FIG. 2, the method may include operations at S101 and S102. As illustrated in FIG. 2, the method for measurement handling in the embodiments of the disclosure includes but is not limited to the following operations.

At S101, a network device sends a stationary criterion to a terminal device.

The network device may configure the stationary criterion for the terminal device. The stationary criterion may contain a first parameter. The terminal device may evaluate whether the terminal device satisfies the stationary criterion based on the first parameter. The terminal device performs a neighboring-cell measurement relaxation when the terminal device satisfies the stationary criterion. As an example, the first parameter may be used to define a new threshold, and optionally, the new threshold may be lower than a threshold defined in an R16 low mobility criterion (e.g. a lowMobilityEvaluation criterion). The first parameter may be another parameter, such as user's subscription information, which is not limited in the present disclosure.

The following will take that a new threshold is defined in the stationary criterion as an example for illustration. For example, in a certain predefined time range, TSearchDeltaP, when a difference between SrxlevRef of a serving cell and a reference signal received power (RSRP) measurement value, Srxlev, of the serving cell is less than the newly defined threshold P, then it is determined that the terminal device satisfies the stationary criterion, and the terminal device may perform the neighboring-cell measurement relaxation. Specifically: (SrxlevRef−Srxlev)<P, where Srxlev is the current measurement value of Srxlev of the serving cell, and SrxlevRef is a reference value of Srxlev of the serving cell. That is, when a difference between the RSRP measurement value of the serving cell where the terminal device camps and SrxlevRef of the serving cell is very small, it means that the terminal device does not have a great demand for cell reselection, and therefore the terminal device can perform the neighboring-cell measurement relaxation, thereby reducing energy consumption in the terminal device. It can be understood that in the case where the newly defined threshold P is configured in system information, the terminal device can perform a cell measurement relaxation. Optionally, when the UE selects or reselects a new cell, or if (Srxlev−SrxlevRef)>0, or in a scenario where a measurement relaxation condition is not satisfied in TSearchDeltaP, the terminal device may set SrxlevRef to be the current measurement value of Srxlev of the serving cell.

The terminal device in the embodiments of the present disclosure may refer to a reduced capability (RedCap) stationary terminal device, such as an industrial wireless sensor and a video monitor. The network device may send the stationary criterion to the terminal device via signaling. The signaling may be a system broadcast message, a system information block (SIB), such as SIB1, SIB2, or other SIBs, or the signaling may be a radio resource control (RRC) dedicated signaling, such as an RRC reconfiguration message. The terminal device may be in an idle state, in an inactive state, or in a connected state, which is not limited in the present disclosure. As an example, for terminal devices in an idle state, in an inactive state, and in a connected state, the network device may configure a stationary criterion for each of all the terminal devices via a broadcast message broadcasted through a broadcast channel. In the embodiment, parameters in stationary criteria for all the terminal devices are the same, without differentiating between terminal devices. For terminal devices in a connected state, the network device may configure for each specific terminal device a stationary criterion dedicated for the specific terminal device, that is, parameters in stationary criteria for different terminal devices may be different.

It can be understood that, in addition to the stationary criterion, the network device may also configure one or more of the following criteria for the terminal device: an R16 low mobility criterion, an R16 not-at-cell-edge criterion, or a new not-at-cell-edge criterion. Optionally, an RSRP threshold defined in the new not-at-cell-edge criterion may be lower than an RSRP threshold defined in the R16 not-at-cell-edge criterion.

At S102, the terminal device performs the neighboring-cell measurement relaxation when the terminal device determines that the terminal device satisfies the stationary criterion.

The measurement relaxation includes one of the following. Perform a neighboring-cell measurement according to a first duration requirement, where a duration contained in the first duration requirement is Ki times a duration contained in a second duration requirement, Ki is an integer greater than 3, and the second duration requirement is a duration requirement based on which the terminal device performs a neighboring-cell non-measurement relaxation; perform the neighboring-cell measurement with a first interval, where the first interval is greater than 1 hour; and stop the neighboring-cell measurement.

In an embodiment, the terminal device can perform an intra-frequency-neighboring-cell measurement, which is referred to as intra-frequency measurement in the present disclosure. The terminal device can also perform an inter-frequency-neighboring-cell measurement, which is referred to as inter-frequency measurement in the present disclosure. The neighboring-cell measurement performed by the terminal device in an idle state or an inactive state is subject to a relevant parameter(s) in a system broadcast message, for example, an RSRP threshold, SIntraSearchP, for starting the intra-frequency measurement and a reference signal received quality (RSRQ) threshold, SIntraSearchQ, for starting the intra-frequency measurement in the system broadcast message. For an intra-frequency neighboring cell, when a signal of a serving cell where the terminal device camps satisfies an intra-frequency measurement condition, the terminal device starts to perform a measurement on the intra-frequency neighboring cell. For example, when an RSRP measurement value, Srxlev, of the serving cell where the terminal device camps>an RSRP threshold, SIntraSearchP, for starting the intra-frequency measurement, and an RSRQ measurement value, Squal, of the serving cell>an RSRQ threshold, SIntraSearchQ, for starting the intra-frequency measurement, the terminal device does not perform an intra-frequency-neighboring-cell measurement, otherwise, the terminal device can perform the intra-frequency-neighboring-cell measurement. That is, the intra-frequency measurement condition may include that the RSRP measurement value, Srxlev, of the serving cell where the terminal device camps is less than or equal to the RSRP threshold, SIntraSearchP, for starting the intra-frequency measurement, and/or the RSRQ measurement value, Squal, of the serving cell is less than or equal to the RSRQ threshold, SIntraSearchQ, for starting the intra-frequency measurement.

For an inter-frequency neighboring cell with an equal priority as the serving cell or a lower priority than the serving cell, when Srxlev of the serving cell>the RSRP threshold, SnonIntraSearchP, for starting the inter-frequency measurement, and the RSRQ measurement value, Squal, of the serving cell>the RSRQ threshold, SnonIntraSearchQ, for starting the inter-frequency measurement, the terminal device does not perform an inter-frequency measurement on the neighboring cell, otherwise, the terminal device performs the inter-frequency measurement on the neighboring cell. For an inter-frequency neighboring cell with a higher priority than the serving cell, the terminal device always performs an inter-frequency measurement on the inter-frequency neighboring cell. That is, the inter-frequency measurement condition may include that a priority of an inter-frequency neighboring cell is higher than the priority of the serving cell where the terminal device camps. Alternatively, for a neighboring cell with an equal priority as the serving cell where the terminal device camps or a lower priority than the serving cell where the terminal device camps, the inter-frequency measurement condition may include that the Srxlev of the serving cell<=the RSRP threshold SnonIntraSearchP for starting an inter-frequency measurement, and/or the RSRQ measurement value Squal of the serving cell<=the RSRQ threshold, SnonIntraSearchQ, for starting an inter-frequency measurement.

In the embodiments of the present disclosure, in an NR radio access, the terminal device can perform a neighboring-cell measurement according to a duration specified in a duration requirement (which may also be referred to as a cell measurement requirement). Three kinds of durations may be specified in the duration requirement, which are respectively a duration $T_{detect}$ for cell detection, a duration $T_{measure}$ for cell measurement, and a duration $T_{evaluate}$ for cell evaluation.

The terminal device can measure RSRP/RSRQ and a physical identifier of a neighboring cell in the duration $T_{detect}$, and determine whether the neighboring cell satisfies a reselection criterion when a value of a cell reselection timer is equal to 0. Further, to perform an interval measurement on a neighboring cell satisfying the reselection criterion, the UE needs to measure at least intra-frequency/inter-frequency synchronization signal (SS)-RSRP or intra-frequency/inter-frequency SS-RSRQ in the duration $T_{measure}$. The terminal device evaluates results of the interval measurement in the duration $T_{evaluate}$.

The neighboring-cell measurement performed by the terminal device includes the intra-frequency measurement and the inter-frequency measurement, and there are a duration requirement for the intra-frequency measurement and a duration requirement for the inter-frequency measurement. The duration requirement for the intra-frequency measurement may be referred to as an intra-frequency measurement requirement, and the duration requirement for the inter-frequency measurement may be referred to as an inter-frequency measurement requirement.

A $T_{detect}$, a $T_{measure}$, and a $T_{evaluate}$ based on which the terminal device performs the intra-frequency-neighboring-cell measurement are defined in the duration requirement for the intra-frequency measurement. For example, Table 1 illustrates examples of the $T_{detect}$, the $T_{measure}$, and the $T_{evaluate}$ defined in the duration requirement for the intra-frequency measurement.

As illustrated in Table 1, the duration in the duration requirement is related to a discontinuous reception (DRX) cycle of the terminal device, for example, for a DRX cycle of 0.32 s, the $T_{detect}$ may be 11.52×N1×M2 seconds or may be 36×N1×M2 times the DRX cycle.

TABLE 1

| DRX cycle length [s] | Scaling Factor (N1) FR1 | Scaling Factor (N1) FR2[Note1] | $T_{detect, NR\_Intra}$ [s] (number of DRX cycles) | $T_{measure, NR\_Intra}$ [s] (number of DRX cycles) | $T_{evaluate, NR\_Intra}$ [s] (number of DRX cycles) |
|---|---|---|---|---|---|
| 0.32 | 1 | 8 | 11.52 × N1 × M2 (36 × N1 × M2) | 1.28 × N1 × M2 (4 × N1 × M2) | 5.12 × N1 × M2 (16 × N1 × M2) |
| 0.64 | | 5 | 17.92 × N1 (28 × N1) | 1.28 × N1 (2 × N1) | 5.12 × N1 (8 × N1) |
| 1.28 | | 4 | 32 × N1 (25 × N1) | 1.28 × N1 (1 × N1) | 6.4 × N1 (5 × N1) |
| 2.56 | | 3 | 58.88 × N1 (23 × N1) | 2.56 × N1 (1 × N1) | 7.68 × N1 (3 × N1) |

*Note1*

Applies for UE supporting power class 2&3&4. For UE supporting power class 1, N1 = 8 for all DRX cycle length.

Note 2:

M2 = 1.5 if SMTC periodicity of measured intra-frequency cell > 20 ms; otherwise M2 = 1. If different SMTC periodicities are configured for different cells, the SMTC periodicity in this note is the one configured by the cell being identified. During PSS/SSS detection, the periodicity of the SMTC configured for the intra-frequency carrier is assumed, and if the actual SSB transmission periodicity is greater than the SMTC configured for the intra-frequency carrier, longer $T_{detect, NR\_intra}$ is expected.

A $T_{detect}$, a $T_{measure}$, and a $T_{evaluate}$ based on which the terminal device performs the inter-frequency-neighboring-cell measurement are defined in the duration requirement for the inter-frequency measurement. For example, Table 2 illustrates examples of the $T_{detect}$, the $T_{measure}$, and the $T_{evaluate}$ defined in the duration requirement for the inter-frequency measurement.

As illustrated in Table 2, the duration in the duration requirement is related to a discontinuous reception (DRX) cycle of the terminal device, for example, for a DRX cycle of 0.32 s, the $T_{detect}$ may be 11.52×N1×1.5 seconds or may be 36×N1×1.5 times the DRX cycle.

TABLE 2

| DRX cycle length [s] | Scaling Factor (N1) FR1 | Scaling Factor (N1) FR2[Note1] | $T_{detect, NR\_Inter}$ [s] (number of DRX cycles) | $T_{measure, NR\_Inter}$ [s] (number of DRX cycles) | $T_{evaluate, NR\_Inter}$ [s] (number of DRX cycles) |
|---|---|---|---|---|---|
| 0.32 | 1 | 8 | 11.52 × N1 × 1.5 (36 × N1 × 1.5) | 1.28 × N1 × 1.5 (4 × N1 × 1.5) | 5.12 × N1 × 1.5 (16 × N1 × 1.5) |
| 0.64 | | 5 | 17.92 × N1 (28 × N1) | 1.28 × N1 (2 × N1) | 5.12 × N1 (8 × N1) |
| 1.28 | | 4 | 32 × N1 (25 × N1) | 1.28 × N1 (1 × N1) | 6.4 × N1 (5 × N1) |
| 2.56 | | 3 | 58.88 × N1 (23 × N1) | 2.56 × N1 (1 × N1) | 7.68 × N1 (3 × N1) |

*Note1*

Applies for UE supporting power class 2&3&4. For UE supporting power class 1, N1 = 8 for all DRX cycle length.

In an embodiment, an energy-saving technology is introduced and the terminal device can perform the neighboring-cell measurement relaxation. The following takes a first measurement relaxation and a second relaxation as an example for illustration.

In the first measurement relaxation, a duration in a duration requirement for the intra-frequency measurement on which the measurement relaxation is based is K1 (K1=3) times a duration in a duration requirement (the duration illustrated in Table 1) for a normal intra-frequency measurement (non-measurement relaxation). Examples of $T_{detect}$, $T_{measure}$, and $T_{evaluate}$ defined in the duration requirement for the intra-frequency measurement in this case are illustrated in Table 3. Correspondingly, a duration in a duration requirement for the inter-frequency measurement on which the measurement relaxation is based is K1 (K1=3) times a duration in a duration requirement (the duration illustrated in Table 2) for the normal inter-frequency measurement (non-measurement relaxation). Examples of $T_{detect}$, $T_{measure}$, and $T_{evaluate}$ defined in the duration requirement for the inter-frequency measurement in this case are illustrated in Table 4.

In the second measurement relaxation, the terminal device can perform a neighboring-cell measurement relaxation. In this case, the terminal device can perform the intra-frequency measurement with a measurement interval of 1 hour and perform the inter-frequency measurement with the measurement interval of 1 hour, that is, the terminal device can perform the intra-frequency-neighboring-cell measurement with the measurement interval of 1 hour and perform the inter-frequency-neighboring-cell measurement with the measurement interval of 1 hour.

Further, optionally, based on the first measurement relaxation and the second measurement relaxation described above, in the case where the terminal device satisfies the stationary criterion, the terminal device can perform the neighboring-cell measurement relaxation in the following optional manners.

In case 1, when a signal of the serving cell where the terminal device camps satisfies the intra-frequency measurement condition and the terminal device satisfies the stationary criterion, the terminal device performs the intra-frequency-neighboring-cell measurement relaxation. The

TABLE 3

| DRX cycle length [s] | Scaling Factor (N1) FR1 | Scaling Factor (N1) FR2[Note1] | $T_{detect, NR\_Intra}$ [s] (number of DRX cycles) | $T_{measure, NR\_Intra}$ [s] (number of DRX cycles) | $T_{evaluate, NR\_Intra}$ [s] (number of DRX cycles) |
|---|---|---|---|---|---|
| 0.32 | 1 | 8 | 11.52 × N1 × M2 × K1 (36 × N1 × M2 × K1) | 1.28 × N1 × M2 × K1 (4 × N1 × M2 × K1) | 5.12 × N1 × M2 × K1 (16 × N1 × M2 × K1) |
| 0.64 | | 5 | 17.92 × N1 × K1 (28 × N1 × K1) | 1.28 × N1 × K1 (2 × N1 × K1) | 5.12 × N1 × K1 (8 × N1 × K1) |
| 1.28 | | 4 | 32 × N1 × K1 (25 × N1 × K1) | 1.28 × N1 × K1 (1 × N1 × K1) | 6.4 × N1 × K1 (5 × N1 × K1) |
| 2.56 | | 3 | 58.88 × N1 × K1 (23 × N1 × K1) | 2.56 × N1 × K1 (1 × N1 × K1) | 7.68 × N1 × K1 (3 × N1 × K1) |

*Note1*

Applies for UE supporting power class 2&3&4. For UE supporting power class 1, N1 = 8 for all DRX cycle length.

Note 2:

M2 = 1.5 if SMTC periodicity of measured intra-frequency cell > 20 ms; otherwise M2 = 1.

Note 3:

K1 = 3 is the measurement relaxation factor applicable for UE fulfilling the lowMobilityEvalutation [2] criterion.

TABLE 4

| DRX cycle length [s] | Scaling Factor (N1) FR1 | Scaling Factor (N1) FR2[Note1] | $T_{detect, NR\_Inter}$ [s] (number of DRX cycles) | $T_{measure, NR\_Inter}$ [s] (number of DRX cycles) | $T_{evaluate, NR\_Inter}$ [s] (number of DRX cycles) |
|---|---|---|---|---|---|
| 0.32 | 1 | 8 | 11.52 × N1 × 1.5 × K1 (36 × N1 × 1.5 × K1) | 1.28 × N1 × 1.5 × K1 (4 × N1 × 1.5 × K1) | 5.12 × N1 × 1.5 × K1 (16 × N1 × 1.5 × K1) |
| 0.64 | | 5 | 17.92 × N1 × K1 (28 × N1 × K1) | 1.28 × N1 × K1 (2 × N1 × K1) | 5.12 × N1 × K1 (8 × N1 × K1) |
| 1.28 | | 4 | 32 × N1 × K1 (25 × N1 × K1) | 1.28 × N1 × K1 (1 × N1 × K1) | 6.4 × N1 × K1 (5 × N1 × K1) |
| 2.56 | | 3 | 58.88 × N1 × K1 (23 × N1 × K1) | 2.56 × N1 × K1 (1 × N1 × K1) | 7.68 × N1 × K1 (3 × N1 × K1) |

*Note1*

Applies for UE supporting power class 2&3&4. For UE supporting power class 1, N1 = 8 for all DRX cycle length.

Note 2:

K1 = 3 is the measurement relaxation factor applicable for UE fulfilling the low mobility.

terminal device can perform the intra-frequency-neighboring-cell measurement relaxation in one of the following manner 1 to manner 3.

In manner 1, the terminal device can perform the intra-frequency-neighboring-cell measurement based on the first duration requirement for the intra-frequency measurement. The first duration requirement for the intra-frequency measurement includes the $T_{detect}$, $T_{measure}$, and $T_{evaluate}$ for the intra-frequency-neighboring-cell measurement. Examples of the $T_{detect}$, $T_{measure}$, and $T_{evaluate}$ defined in the first duration requirement for the intra-frequency measurement in this case are illustrated in Table 5. The duration defined in the first duration requirement for the intra-frequency measurement is K2 times the duration in the duration requirement for the normal intra-frequency measurement (non-measurement relaxation), where K2 is an integer greater than 3, for example, K2 can be 4, 5, or 6. Compared with the first measurement relaxation in which in Table 1 K1 in each duration equals to 3, in manner 1 K2 is an integer greater than 3, so that the terminal device can perform a further measurement relaxation to achieve further reduction in power consumption.

In manner 3, the terminal device stops the intra-frequency-neighboring-cell measurement, that is, the terminal device does not perform the intra-frequency-neighboring-cell measurement.

In case 2, when a signal of the serving cell where the terminal device camps satisfies the inter-frequency measurement condition and the terminal device satisfies the stationary criterion, the terminal device performs an inter-frequency-neighboring-cell measurement. The terminal device can perform the inter-frequency-neighboring-cell measurement relaxation in one of the following manner 1 to manner 3.

In manner 1, the terminal device can perform the inter-frequency-neighboring-cell measurement based on the first duration requirement for the inter-frequency measurement. The first duration requirement for the inter-frequency measurement includes the $T_{detect}$, $T_{measure}$, and $T_{evaluate}$ for the inter-frequency-neighboring-cell measurement. Examples of the $T_{detect}$, $T_{measure}$, and $T_{evaluate}$ defined in the first duration requirement for the inter-frequency measurement in this case are illustrated in Table 6. The duration defined in the first duration requirement for the inter-frequency measurement is K3 times the duration in the duration requirement for the normal inter-frequency measurement (non-measurement relaxation), where K3 is an integer greater than 3, for example, K3 can be 4, 5, or 6. Compared with the first measurement relaxation in which in Table 4 K1 in each duration equals to 3, in manner 1 K3 is an integer greater than 3, so that the terminal device can perform a further measurement relaxation to achieve further reduction in power consumption.

TABLE 5

| DRX cycle length [s] | Scaling Factor (N1) FR1 | FR2[Note1] | $T_{detect, NR\_Intra}$ [s] (number of DRX cycles) | $T_{measure, NR\_Intra}$ [s] (number of DRX cycles) | $T_{evaluate, NR\_Intra}$ [s] (number of DRX cycles) |
|---|---|---|---|---|---|
| 0.32 | 1 | 8 | 11.52 × N1 × M2 × K2 (36 × N1 × M2 × K2) | 1.28 × N1 × M2 × K2 (4 × N1 × M2 × K2) | 5.12 × N1 × M2 × K2 (16 × N1 × M2 × K2) |
| 0.64 | | 5 | 17.92 × N1 × K2 (28 × N1 × K2) | 1.28 × N1 × K2 (2 × N1 × K2) | 5.12 × N1 × K2 (8 × N1 × K2) |
| 1.28 | | 4 | 32 × N1 × K2 (25 × N1 × K2) | 1.28 × N1 × K2 (1 × N1 × K2) | 6.4 × N1 × K2 (5 × N1 × K2) |
| 2.56 | | 3 | 58.88 × N1 × K2 (23 × N1 × K2) | 2.56 × N1 × K2 (1 × N1 × K2) | 7.68 × N1 × K2 (3 × N1 × K2) |

Note1

Applies for UE supporting power class 2&3&4. For UE supporting power class 1, N1 = 8 for all DRX cycle length.

Note 2:

M2 = 1.5 if SMTC periodicity of measured intra-frequency cell > 20 ms; otherwise M2 = 1.

Note 3:

K2 is an integer greater than 3, for example, K2 can be 4, 5, or 6. K2 is the measurement relaxation factor applicable for UE fulfilling the stationary criterion.

In manner 2, the terminal device performs the intra-frequency-neighboring-cell measurement every N1 hours, where N1 is an integer greater than 1. That is, the terminal device can perform the intra-frequency-neighboring-cell measurement with a time interval greater than 1 hour. Compared with the second measurement relaxation described above in which the intra-frequency-neighboring-cell measurement relaxation is performed every measurement interval of 1 hour, in manner 2 the intra-frequency measurement is performed with a greater time interval, so that the terminal device can perform a further measurement relaxation to achieve further reduction in power consumption.

As an example, K3 may be the same as or different from K2.

TABLE 6

| DRX cycle length [s] | Scaling Factor (N1) FR1 | FR2[Note1] | $T_{detect, NR\_Inter}$ [s] (number of DRX cycles) | $T_{measure, NR\_Inter}$ [s] (number of DRX cycles) | $T_{evaluate, NR\_Inter}$ [s] (number of DRX cycles) |
|---|---|---|---|---|---|
| 0.32 | 1 | 8 | 11.52 × N1 × 1.5 × K3 (36 × N1 × 1.5 × K3) | 1.28 × N1 × 1.5 × K3(4 × N1 × 1.5 × K3) | 5.12 × N1 × 1.5 × K3 (16 × N1 × 1.5 × K3) |

TABLE 6-continued

| DRX cycle length [s] | Scaling Factor (N1) FR1 | FR2[Note1] | $T_{detect, NR\_Inter}$ [s] (number of DRX cycles) | $T_{measure, NR\_Inter}$ [s] (number of DRX cycles) | $T_{evaluate, NR\_Inter}$ [s] (number of DRX cycles) |
|---|---|---|---|---|---|
| 0.64 | | 5 | 17.92 × N1 × K3 (28 × N1 × K3) | 1.28 × N1 × K3 (2 × N1 × K3) | 5.12 × N1 × K3 (8 × N1 × K3) |
| 1.28 | | 4 | 32 × N1 × K3 (25 × N1 × K3) | 1.28 × N1 × K3 (1 × N1 × K3) | 6.4 × N1 × K3 (5 × N1 × K3) |
| 2.56 | | 3 | 58.88 × N1 × K3 (23 × N1 × K3) | 2.56 × N1 × K3 (1 × N1 × K3) | 7.68 × N1 × K3 (3 × N1 × K3) |

*Note*1

Applies for UE supporting power class 2&3&4. For UE supporting power class 1, N1 = 8 for all DRX cycle length.

Note 3:

K3 is an integer greater than 3, for example, K3 can be 4, 5, or 6. K3 is the measurement relaxation factor applicable for UE fulfilling the stationary criterion.

In manner 2, the terminal device performs the inter-frequency-neighboring-cell measurement every N2 hours, where N2 is an integer greater than 1. That is, the terminal device can perform the inter-frequency-neighboring-cell measurement with a time interval greater than 1 hour. Compared with the second measurement relaxation described above in which the inter-frequency-neighboring-cell measurement relaxation is performed every a measurement interval of 1 hour, in manner 2 the inter-frequency measurement is performed with a greater time interval, so that the terminal device can perform a further measurement relaxation to achieve further reduction in power consumption.

As an example, N2 may be the same as or different from N1.

In manner 3, the terminal device stops the inter-frequency-neighboring-cell measurement, that is, the terminal device does not perform the inter-frequency-neighboring-cell measurement.

In the embodiments of the present disclosure, in the case that the terminal device satisfies the stationary criterion, the terminal device can perform the following. The terminal device can perform the neighboring-cell measurement according to the first duration requirement, where the duration contained in the first duration requirement is Ki times the duration contained in the second duration requirement, and Ki is an integer greater than 3. Alternatively, the terminal device can perform the neighboring-cell measurement with the time interval greater than 1 hour. Alternatively, the terminal device can stop the neighboring-cell measurement. Therefore, the terminal device can perform the neighboring-cell measurement relaxation, thereby reducing power consumption.

Reference is made to FIG. 3, which is a schematic flow chart of another method for measurement handling provided in the disclosure. FIG. 1 illustrates an exemplary network architecture to which the method for measurement handling is applied. As illustrated in FIG. 3, the method may include operations at S201 to S204. As illustrated in FIG. 3, the method for measurement handling in the embodiments of the present disclosure includes but is not limited to the following operations.

At S201, a network device sends a stationary criterion to a terminal device, where the stationary criterion contains a first parameter for the terminal device to evaluate whether to perform a neighboring-cell measurement relaxation.

In the embodiments of the present disclosure, for the operation at S201, reference can be made to the operation at S101 of the embodiment illustrated in FIG. 2, which will not be repeated here.

At S202, the network device sends a not-at-cell-edge criterion to the terminal device, where the not-at-cell-edge criterion contains a second parameter for the terminal device to evaluate whether to perform the neighboring-cell measurement relaxation.

In an embodiment, the network device may send one or more not-at-cell-edge criteria to the terminal device. In an example, the network device sends a first not-at-cell-edge criterion and/or a second not-at-cell-edge criterion to the terminal device, and a second parameter value in the second not-at-cell-edge criterion is lower than a second parameter value in the first not-at-cell-edge criterion.

In an example, the first not-at-cell-edge criterion may be an existing not-at-cell-edge criterion in the existing communication system, the second not-at-cell-edge criterion may be a designed new not-at-cell-edge criterion, and the second not-at-cell-edge criterion may contain a threshold lower than a threshold contained in the first not-at-cell-edge criterion. For example, the second not-at-cell-edge criterion may be the new not-at-cell-edge criterion (such as an R17 not-at-cell-edge criterion), and the first not-at-cell-edge criterion may be an R16 not-at-cell-edge criterion. An RSRP threshold defined in the new not-at-cell-edge criterion may be lower than an RSRP threshold defined in the R16 not-at-cell-edge criterion. Take that the first not-at-cell-edge criterion contains an RSRP threshold and the second not-at-cell-edge criterion contains an RSRP threshold lower than the RSRP threshold in the first not-at-cell-edge criterion as an example, when the RSRP measurement value of the serving cell is greater than the RSRP threshold contained in the first not-at-cell-edge criterion, it is determined that the terminal device satisfies the first not-at-cell-edge criterion, and when the RSRP measurement value of the serving cell is greater than the RSRP threshold contained in the second not-at-cell-edge criterion, it is determined that the terminal device satisfies the second not-at-cell-edge criterion.

The network device may send the not-at-cell-edge criterion to the terminal device via signaling. The signaling may be a system broadcast message, such as SIB1, SIB2 or other SIB, or the signaling may be an RRC dedicated signaling, such as an RRC reconfiguration message. The terminal device may be in an idle state, in an inactive state, or in a connected state, which is not limited in the present disclosure. As an example, for terminal devices in an idle state, in an inactive state, and in a connected state, the network device may configure a stationary criterion for each of all the terminal devices via a broadcast message broadcasted through a broadcast channel. In the embodiment, parameters in stationary criteria for all the terminal devices are the same, without differentiating between terminal devices. For terminal devices in a connected state, the network device may configure for each specific terminal device a stationary criterion dedicated for the specific terminal device, that is, parameters in stationary criteria for different terminal devices may be different.

It can be understood that, in addition to configuring a stationary criterion for the terminal device, the network device may also send an R16 low mobility criterion to the terminal device.

At S203, the network device sends indication information to the terminal device. The indication information indicates that the terminal device performs the neighboring-cell measurement relaxation when the terminal device satisfies both the stationary criterion and the not-at-cell-edge criterion.

At S204, the terminal device performs, based on the indication information, the neighboring-cell measurement relaxation when the terminal device determines that the terminal device satisfies both the stationary criterion and the not-at-cell-edge criterion.

In an embodiment, the network device may send the indication information to the terminal device, optionally, the network device may send the indication information to the terminal device via signaling, where the signaling may be a system broadcast message, such as SIB1, SIB2 or other SIB, or the signaling may be an RRC dedicated signaling, such as an RRC reconfiguration message. The indication information may indicate a not-at-cell-edge criterion bound to the stationary criterion. For example, if the network device sends first indication information and the first indication information indicates that the stationary criterion is bound to the first not-at-cell-edge criterion, the terminal device performs the neighboring-cell measurement relaxation when the terminal device satisfies both the stationary criterion and the first not-at-cell-edge criterion. If the network device sends second indication information and the second indication information indicates that the stationary criterion is bound to the second not-at-cell-edge criterion, the terminal device performs the neighboring-cell measurement relaxation when the terminal device satisfies both the stationary criterion and the second not-at-cell-edge criterion. It can be understood that the terminal device performs the measurement relaxation in a manner when the terminal device satisfies the stationary criterion and a not-at-cell-edge criterion and performs the measurement relaxation in another manner when the terminal device satisfies the stationary criterion and another not-at-cell-edge criterion. The following will illustrate that the terminal device performs the neighboring-cell measurement relaxation by taking that the first not-at-cell-edge criterion is the R16 not-at-cell-edge criterion and the second not-at-cell-edge criterion is the new not-at-cell-edge criterion as an example.

In the first optional embodiment, the second not-at-cell-edge criterion is the new not-at-cell-edge criterion, and the network device may configure the stationary criterion, the new not-at-cell-edge criterion, and the second indication information for the terminal device. The second indication information is a new combineRelaxedMeasCondition indication (e.g., combineRelaxedMeasCondition1), and the second indication information indicates that the terminal device performs the neighboring-cell measurement relaxation when the terminal device satisfies both the stationary criterion and the new not-at-cell-edge criterion. The terminal device may perform an intra-frequency-neighboring-cell measurement and/or an inter-frequency-neighboring-cell measurement, and the intra-frequency-neighboring-cell measurement and the inter-frequency-neighboring-cell measurement are illustrated respectively as follows.

In case 1, for the intra-frequency measurement, the network device may configure the stationary criterion, the new not-at-cell-edge criterion, and the second indication information for the terminal device, and the terminal device can perform the intra-frequency-neighboring-cell measurement when the signal of the serving cell where the terminal device camps satisfies an intra-frequency measurement condition. If the terminal device further satisfies both the stationary criterion and the new not-at-cell-edge criterion, the terminal device can perform the intra-frequency-neighboring-cell measurement relaxation. The terminal device can perform the intra-frequency-neighboring-cell measurement in one of the following manner 1 to manner 3.

In manner 1, the terminal device can perform the intra-frequency-neighboring-cell measurement according to the first duration requirement for the intra-frequency measurement. The first duration requirement for the intra-frequency measurement includes the $T_{detect}$, $T_{measure}$, and $T_{evaluate}$ for the intra-frequency-neighboring-cell measurement. Examples of the $T_{detect}$, $T_{measure}$, and $T_{evaluate}$ defined in the first duration requirement for the intra-frequency measurement in this case are illustrated in Table 7. The duration defined in the first duration requirement for the intra-frequency measurement is K4 times the duration in the duration requirement for the normal intra-frequency measurement (non-measurement relaxation), where K4 is an integer greater than K2, for example, K4 can be 4, 5, or 6. Compared with K2 in the duration illustrated in Table 5 above, in this manner, the terminal device needs to satisfy more stringent criteria (the terminal device needs to satisfy both the stationary criterion and the not-at-cell-edge criterion), and the terminal device can perform a more relaxed measurement relaxation, and thus K4 can be an integer greater than K2. Since the duration defined in the first duration requirement for the intra-frequency measurement in this manner is longer, the terminal device can perform a more relaxed measurement relaxation, thereby realizing a further reduction in power consumption of the terminal device.

TABLE 7

| DRX cycle length [s] | Scaling Factor (N1) FR1 | Scaling Factor (N1) FR2[Note1] | $T_{detect, NR\_Intra}$ [s] (number of DRX cycles) | $T_{measure, NR\_Intra}$ [s] (number of DRX cycles) | $T_{evaluate, NR\_Intra}$ [s] (number of DRX cycles) |
|---|---|---|---|---|---|
| 0.32 | 1 | 8 | 11.52 × N1 × M2 × K4 (36 × N1 × M2 × K4 | 1.28 × N1 × M2 × K4 (4 × N1 × M2 × K4) | 5.12 × N1 × M2 × K4 (16 × N1 × M2 × K4) |
| 0.64 | | 5 | 17.92 × N1 × K4 (28 × N1 × K4) | 1.28 × N1 × K4 (2 × N1 × K4) | 5.12 × N1 × K4 (8 × N1 × K4) |

TABLE 7-continued

| DRX cycle length [s] | Scaling Factor (N1) FR1 | FR2[Note1] | $T_{detect, NR\_Intra}$ [s] (number of DRX cycles) | $T_{measure, NR\_Intra}$ [s] (number of DRX cycles) | $T_{evaluate, NR\_Intra}$ [s] (number of DRX cycles) |
|---|---|---|---|---|---|
| 1.28 | | 4 | 32 × N1 × K4 (25 × N1 × K4) | 1.28 × N1 × K4 (1 × N1 × K4) | 6.4 × N1 × K4 (5 × N1 × K4) |
| 2.56 | | 3 | 58.88 × N1 × K4 (23 × N1 × K4) | 2.56 × N1 × K4 (1 × N1 × K4) | 7.68 × N1 × K4 (3 × N1 × K4) |

Note1

Applies for UE supporting power class 2&3&4. For UE supporting power class 1, N1 = 8 for all DRX cycle length.

Note 2:

M2 = 1.5 if SMTC periodicity of measured intra-frequency cell > 20 ms; otherwise M2 = 1.

Note 3:

K4 is an integer greater than K2, for example, K4 can be 4, 5, or 6. K4 is the measurement relaxation factor applicable for UE fulfilling the stationary criterion.

In manner 2, the terminal device performs the intra-frequency-neighboring-cell measurement every N3 hours, where N3 may be an integer greater than N1 in the foregoing embodiment. In some optional manners, N3=3, that is, the terminal device performs the intra-frequency-neighboring-cell measurement every 3 hours. Compared with the embodiment illustrated in FIG. 2 above in which the intra-frequency neighboring-cell measurement is performed every measurement interval of N1 hour, in this manner, the terminal device needs to satisfy more stringent criteria (the terminal device needs to satisfy both the stationary criterion and the not-at-cell-edge criterion), and the terminal device can perform a more relaxed measurement relaxation, and thus N3 can be an integer greater than N1. Since the intra-frequency measurement is performed with a greater time interval in manner 2, the terminal device can perform a more relaxed measurement relaxation, thereby realizing a further reduction in power consumption of the terminal device.

In manner 3, the terminal device stops the intra-frequency-neighboring-cell measurement, that is, the terminal device does not perform the intra-frequency-neighboring-cell measurement.

In case 2, for the inter-frequency measurement, the network device may configure the stationary criterion, the new not-at-cell-edge criterion, and the second indication information for the terminal device, and the terminal device can perform the inter-frequency-neighboring-cell measurement when the signal of the serving cell where the terminal device camps satisfies an inter-frequency measurement condition. If the terminal device further satisfies both the stationary criterion and the new not-at-cell-edge criterion, the terminal device can perform the inter-frequency-neighboring-cell measurement relaxation. The terminal device can perform the inter-frequency-neighboring-cell measurement in one of the following manner 1 to manner 3.

In manner 1, the terminal device can perform the inter-frequency-neighboring-cell measurement according to the first duration requirement for the inter-frequency measurement. The first duration requirement for the inter-frequency measurement includes the $T_{detect}$, $T_{measure}$, and $T_{evaluate}$ for the inter-frequency-neighboring-cell measurement. Examples of the $T_{detect}$, $T_{measure}$, and $T_{evaluate}$ defined in the first duration requirement for the inter-frequency measurement in this case are illustrated in Table 8. The duration defined in the first duration requirement for the inter-frequency measurement is K5 times the duration in the duration requirement for the normal inter-frequency measurement (non-measurement relaxation), where K5 is an integer greater than K3, for example, K5 can be 4, 5, or 6. Compared with K3 in the duration illustrated in Table 6 above, in this manner, the terminal device needs to satisfy more stringent criteria (the terminal device needs to satisfy both the stationary criterion and the not-at-cell-edge criterion), and the terminal device can perform a more relaxed measurement relaxation, and thus K5 can be an integer greater than K3. Since the duration defined in the first duration requirement for the inter-frequency measurement in this manner is longer, the terminal device can perform a more relaxed measurement relaxation, thereby realizing a further reduction in power consumption of the terminal device.

As an example, K5 may be the same as or different from K4.

TABLE 8

| DRX cycle length [s] | Scaling Factor (N1) FR1 | FR2[Note1] | $T_{detect, NR\_Inter}$ [s] (number of DRX cycles) | $T_{measure, NR\_Inter}$ [s] (number of DRX cycles) | $T_{evaluate, NR\_Inter}$ [s] (number of DRX cycles) |
|---|---|---|---|---|---|
| 0.32 | 1 | 8 | 11.52 × N1 × 1.5 × K5 (36 × N1 × 1.5 × K5) | 1.28 × N1 × 1.5 × K5(4 × N1 × 1.5 × K5) | 5.12 × N1 × 1.5 × K5 (16 × N1 × 1.5 × K5) |
| 0.64 | | 5 | 17.92 × N1 × K5 (28 × N1 × K5) | 1.28 × N1 × K5 (2 × N1 × K5) | 5.12 × N1 × K5 (8 × N1 × K5) |
| 1.28 | | 4 | 32 × N1 × K5 (25 × N1 × K5) | 1.28 × N1 × K5 (1 × N1 × K5) | 6.4 × N1 × K5 (5 × N1 × K5) |

TABLE 8-continued

| DRX cycle length [s] | Scaling Factor (N1) FR1 | FR2[Note1] | $T_{detect, NR\_Inter}$ [s] (number of DRX cycles) | $T_{measure, NR\_Inter}$ [s] (number of DRX cycles) | $T_{evaluate, NR\_Inter}$ [s] (number of DRX cycles) |
|---|---|---|---|---|---|
| 2.56 | | 3 | 58.88 × N1 × K5 (23 × N1 × K5) | 2.56 × N1 × K5 (1 × N1 × K5) | 7.68 × N1 × K5 (3 × N1 × K5) |

Note1

Applies for UE supporting power class 2&3&4. For UE supporting power class 1, N1 = 8 for all DRX cycle length.

Note 3:

K5 is an integer greater than K3, for example, K5 can be 4, 5, or 6. K5 is the measurement relaxation factor applicable for UE fulfilling the stationary criterion.

In manner 2, the terminal device performs the inter-frequency-neighboring-cell measurement every N4 hours, where N4 may be an integer greater than N2 in the foregoing embodiment. In some optional manners, N4=3, that is, the terminal device performs the inter-frequency-neighboring-cell measurement every 3 hours. Compared with the embodiment illustrated in FIG. 2 above in which the inter-frequency-neighboring-cell measurement is performed every measurement interval of N2 hours, in this manner, the terminal device needs to satisfy more stringent criteria (the terminal device needs to satisfy both the stationary criterion and the not-at-cell-edge criterion), and the terminal device can perform a more relaxed measurement relaxation, and thus N4 can be an integer greater than N2. Since the inter-frequency measurement is performed with a greater time interval in manner 2, the terminal device can perform a more relaxed measurement relaxation, thereby realizing a further reduction in power consumption of the terminal device.

As an example, N4 may be the same as or different from N3.

In manner 3, the terminal device stops the inter-frequency-neighboring-cell measurement, that is, the terminal device does not perform the inter-frequency-neighboring-cell measurement.

In the second optional embodiment, the second not-at-cell-edge criterion is an R16 not-at-cell-edge criterion, and the network device may configure the stationary criterion, the R16 not-at-cell-edge criterion, and the first indication information for the terminal device. The first indication information is a new combineRelaxedMeasCondition indication (e.g., combineRelaxedMeasCondition2), and the first indication information indicates that the terminal device performs a neighboring-cell measurement relaxation when the terminal device satisfies both the stationary criterion and the R16 not-at-cell-edge criterion. The terminal device may perform an intra-frequency-neighboring-cell measurement and/or an inter-frequency-neighboring-cell measurement, and the intra-frequency-neighboring-cell measurement and the inter-frequency-neighboring-cell measurement are illustrated respectively as follows.

In case 1, for the intra-frequency measurement, the network device may configure the stationary criterion, the R16 not-at-cell-edge criterion, and the first indication information for the terminal device, and the terminal device can perform the intra-frequency-neighboring-cell measurement when the signal of the serving cell where the terminal device camps satisfies an intra-frequency measurement condition. If the terminal device further satisfies both the stationary criterion and the R16 not-at-cell-edge criterion, the terminal device can perform the intra-frequency-neighboring-cell measurement relaxation. The terminal device can perform the intra-frequency-neighboring-cell measurement relaxation in one of the following manner 1 to manner 3.

In manner 1, the terminal device can perform the intra-frequency-neighboring-cell measurement according to the first duration requirement for the intra-frequency measurement. The first duration requirement for the intra-frequency measurement includes the $T_{detect}$, $T_{measure}$, and $T_{evaluate}$ for the intra-frequency-neighboring-cell measurement. Examples of the $T_{detect}$, $T_{measure}$, and $T_{evaluate}$ defined in the first duration requirement for the intra-frequency measurement in this case are illustrated in Table 9. The duration defined in the first duration requirement for the intra-frequency measurement is K6 times the duration in the duration requirement for the normal intra-frequency measurement (non-measurement relaxation), where K6 is an integer greater than K2, for example, K6 can be 4, 5, or 6. Compared with K2 in the duration illustrated in Table 5 above, in this manner, the terminal device needs to satisfy more stringent criteria (the terminal device needs to satisfy both the stationary criterion and the not-at-cell-edge criterion), and the terminal device can perform a more relaxed measurement relaxation, and thus K6 can be an integer greater than K2. Since the duration defined in the first duration requirement for the intra-frequency measurement in this manner is longer, the terminal device can perform a more relaxed measurement relaxation, thereby realizing a further reduction in power consumption of the terminal device.

In addition, compared with K4 in the duration illustrated in Table 7 above, the threshold defined in the R16 not-at-cell-edge criterion is higher than the threshold defined in the new not-at-cell-edge criterion, that is, the condition for the terminal device to determine to perform the measurement relaxation is more stringent, and the terminal device can perform a more relaxed measurement, and thus K6 can be an integer greater than K4, thereby realizing further power saving of the terminal device.

TABLE 9

| DRX cycle length | Scaling Factor (N1) | | $T_{detect, NR\_Intra}$ [s] (number of | $T_{measure, NR\_Intra}$ [s] (number of | $T_{evaluate, NR\_Intra}$ [s] (number of |
|---|---|---|---|---|---|
| [s] | FR1 | FR2[Note1] | DRX cycles) | DRX cycles) | DRX cycles) |
| 0.32 | 1 | 8 | 11.52 × N1 × M2 × K6 (36 × N1 × M2 × K6) | 1.28 × N1 × M2 × K6 (4 × N1 × M2 × K6) | 5.12 × N1 × M2 × K6 (16 × N1 × M2 × K6) |
| 0.64 | | 5 | 17.92 × N1 × K6 (28 × N1 × K6) | 1.28 × N1 × K6 (2 × N1 × K6) | 5.12 × N1 × K6 (8 × N1 × K6) |
| 1.28 | | 4 | 32 × N1 × K6 (25 × N1 × K6) | 1.28 × N1 × K6 (1 × N1 × K6) | 6.4 × N1 × K6 (5 × N1 × K6) |
| 2.56 | | 3 | 58.88 × N1 × K6 (23 × N1 × K6) | 2.56 × N1 × K6 (1 × N1 × K6) | 7.68 × N1 × K6 (3 × N1 × K6) |

Note1

Applies for UE supporting power class 2&3&4. For UE supporting power class 1, N1 = 8 for all DRX cycle length.

Note 2:

M2 = 1.5 if SMTC periodicity of measured intra-frequency cell > 20 ms; otherwise M2 = 1.

Note 3:

K6 is an integer greater than K2, for example, K6 can be 4, 5, or 6. K6 is the measurement relaxation factor applicable for UE fulfilling the stationary criterion.

In manner 2, the terminal device performs the intra-frequency-neighboring-cell measurement every N5 hours, where N5 may be an integer greater than 3. Compared with the forgoing embodiment in which the network device configures both the new not-at-cell-edge criterion and the second indication information and the terminal device performs the intra-frequency-neighboring-cell measurement every the measurement interval of N3 hour, in this manner, the threshold defined in the R16 not-at-cell-edge criterion is higher than the threshold defined in the new not-at-cell-edge criterion, that is, the condition for the terminal device to determine to perform the measurement relaxation is more stringent, and the terminal device can perform a more relaxed measurement, and thus N5 can be an integer greater than N3 in the foregoing embodiment.

In manner 3, the terminal device stops the intra-frequency-neighboring-cell measurement, that is, the terminal device does not perform the intra-frequency-neighboring-cell measurement.

In case 2, for the inter-frequency measurement, the network device may configure the stationary criterion, the R16 not-at-cell-edge criterion, and the first indication information for the terminal device, and the terminal device can perform the inter-frequency-neighboring-cell measurement when the signal of the serving cell where the terminal device camps satisfies the inter-frequency measurement condition. If the terminal device further satisfies both the stationary criterion and the R16 not-at-cell-edge criterion, the terminal device can perform the inter-frequency-neighboring-cell measurement relaxation. The terminal device can perform the inter-frequency-neighboring-cell measurement in one of the following manner 1 to manner 3.

In manner 1, the terminal device can perform the inter-frequency-neighboring-cell measurement based on the first duration requirement for the inter-frequency measurement. The first duration requirement for the inter-frequency measurement includes the $T_{detect}$, $T_{measure}$, and $T_{evaluate}$ for the inter-frequency-neighboring-cell measurement. Examples of the $T_{detect}$, $T_{measure}$, and $T_{evaluate}$ defined in the first duration requirement for inter-frequency measurement in this case are illustrated in Table 10. The duration defined in the first duration requirement for the inter-frequency measurement is K7 times the duration in the duration requirement for the normal inter-frequency measurement (non-measurement relaxation), where K7 is an integer greater than K3, for example, K7 may be 4, 5, or 6. In addition, K7 may be an integer greater than K5. Compared with K3 in the duration illustrated in Table 6 above, in this manner, the terminal device needs to satisfy more stringent criteria (the terminal device needs to satisfy both the stationary criterion and the not-at-cell-edge criterion), and the terminal device can perform a more relaxed measurement relaxation, and thus K5 can be an integer greater than K3. Since the duration defined in the first duration requirement for the inter-frequency measurement in this manner is longer, the terminal device can perform a more relaxed measurement relaxation, thereby realizing a further reduction in power consumption of the terminal device.

In addition, compared with K5 in the duration illustrated in Table 8 above, the threshold defined in the R16 not-at-cell-edge criterion is higher than the threshold defined in the new not-at-cell-edge criterion, that is, the condition for the terminal device to perform the measurement relaxation is more stringent, and the terminal device can perform a more relaxed measurement, and thus K7 can be an integer greater than K5, thereby realizing further power saving of the terminal device.

As an example, K7 may be the same as or different from K6.

TABLE 10

| DRX cycle length | Scaling Factor (N1) | | $T_{detect, NR\_Inter}$ [s] (number of | $T_{measure, NR\_Inter}$ [s] (number of | $T_{evaluate, NR\_Inter}$ [s] (number of |
|---|---|---|---|---|---|
| [s] | FR1 | FR2[Note1] | DRX cycles) | DRX cycles) | DRX cycles) |
| 0.32 | 1 | 8 | 11.52 × N1 × 1.5 × K7 (36 × N1 × 1.5 × K7) | 1.28 × N1 × 1.5 × K7(4 × N1 × 1.5 × K7) | 5.12 × N1 × 1.5 × K7 (16 × N1 × 1.5 × K7) |

TABLE 10-continued

| DRX cycle length [s] | Scaling Factor (N1) FR1 | FR2[Note1] | $T_{detect, NR\_Inter}$ [s] (number of DRX cycles) | $T_{measure, NR\_Inter}$ [s] (number of DRX cycles) | $T_{evaluate, NR\_Inter}$ [s] (number of DRX cycles) |
|---|---|---|---|---|---|
| 0.64 | | 5 | 17.92 × N1 × K7 (28 × N1 × K7) | 1.28 × N1 × K7 (2 × N1 × K7) | 5.12 × N1 × K7 (8 × N1 × K7) |
| 1.28 | | 4 | 32 × N1 × K7 (25 × N1 × K7) | 1.28 × N1 × K7 (1 × N1 × K7) | 6.4 × N1 × K7 (5 × N1 × K7) |
| 2.56 | | 3 | 58.88 × N1 × K7 (23 × N1 × K7) | 2.56 × N1 × K7 (1 × N1 × K7) | 7.68 × N1 × K7 (3 × N1 × K7) |

*Note1*

Applies for UE supporting power class 2&3&4. For UE supporting power class 1, N1 = 8 for all DRX cycle length.

Note 3:

K7 is an integer greater than K3, for example, K7 can be 4, 5, or 6. K7 is the measurement relaxation factor applicable for UE fulfilling the stationary criterion.

In manner 2, the terminal device performs the inter-frequency-neighboring-cell measurement every N6 hours, where N6 may be an integer greater than 3. Compared with the forging embodiment in which the network device configures the new not-at-cell-edge criterion and the second indication information and the terminal device performs the inter-frequency-neighboring-cell measurement every the measurement interval of N4 hour, in this manner, the threshold defined in the R16 not-at-cell-edge criterion is higher than the threshold defined in the new not-at-cell-edge criterion, that is, the condition for the terminal device to determine to perform the measurement relaxation is more stringent and the terminal device can perform a more relaxed measurement, and thus N6 can be an integer greater than N4 in the foregoing embodiment.

As an example, N6 may be the same as or different from N5.

In manner 3, the terminal device stops the inter-frequency-neighboring-cell measurement, that is, the terminal device does not perform the inter-frequency-neighboring-cell measurement.

It may be noted that in the case where the network device configures the stationary criterion, the first not-at-cell-edge criterion, the second not-at-cell-edge criterion, the first indication information, and the second indication information for the terminal device, for example, the network device configures the stationary criterion, the R16 not-at-cell-edge criterion, the new not-at-cell-edge criterion, the first indication information, and the second indication information for the terminal device, if the terminal device satisfies the stationary criterion, the first not-at-cell-edge criterion, and the second not-at-cell-edge criterion, the terminal device may be specified to adopt a measurement relaxation manner corresponding to a not-at-cell-edge criterion, for example, the terminal device may be specified to adopt the measurement relaxation manner corresponding to the second not-at-cell-edge criterion, that is, when the terminal device satisfies the stationary criterion, the R16 not-at-cell-edge criterion, and the new not-at-cell-edge criterion, the terminal device adopts the measurement relaxation manner in the first optional embodiment described above, and for details, reference can be made to the detailed illustrations in the first optional embodiment, which will not be repeated here.

It can be understood that various possible measurement relaxation manners in various scenarios (also referred to as various situations) illustrated in FIG. 2 and/or FIG. 3 may be combined with each other for use. For example, it may be predefined that when the network device does not configure the indication information and the terminal device satisfies the stationary criterion, the terminal device can perform the measurement relaxation in manner 1 in a corresponding embodiment, and it may be predefined that when the network device configures the second indication information and the terminal device satisfies both the stationary criterion and the second not-at-cell-edge criterion, manner 3 in a corresponding embodiment is adopted.

In consistence with the method illustrated in the method embodiment above, the embodiments of the present disclosure also provide an apparatus for measurement handling. The apparatus for measurement handling includes modules for implementing the embodiment. The modules may be software modules, or hardware modules, or a combination of software modules and hardware modules.

Figure 4:
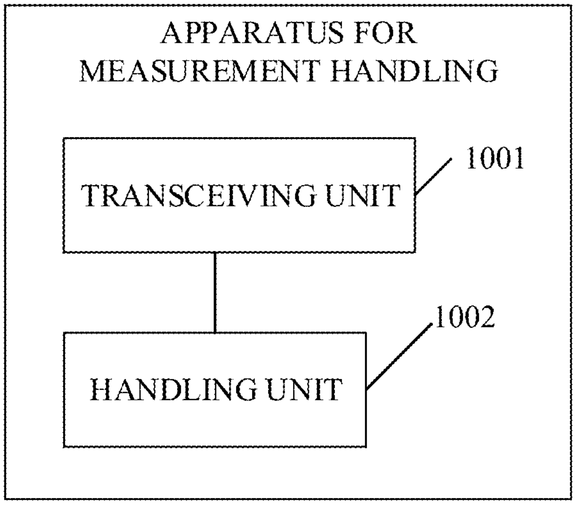
FIG. 4 is a schematic structural diagram of an apparatus for measurement handling provided in the disclosure.

Reference is made to FIG. 4, which is a schematic structural diagram of an apparatus for measurement handling of embodiments of the present disclosure. The apparatus for measurement handling may be applied to the terminal device, optionally, the apparatus for measurement handling may be a terminal device, an apparatus in the terminal device, or an apparatus that can be matched with the terminal device.

The apparatus for measurement handling illustrated in FIG. 4 may include a transceiving unit 1001 and a handling unit 1002. The transceiving unit 1001 may be divided into a transmitting unit and a receiving unit. The transmitting unit is configured to implement a transmitting function, and the receiving unit is configured to implement a receiving function. The transceiving unit 1001 may implement the transmitting function and/or the receiving function. The transceiving unit may also be described as a communication unit.

The transceiving unit 1001 is configured to receive a stationary criterion from a network device.

The handling unit 1002 is configured to perform a neighboring-cell measurement relaxation when the terminal device satisfies the stationary criterion.

The measurement relaxation includes one of the following: performing a neighboring-cell measurement according to a first duration requirement, where a duration contained in the first duration requirement is Ki times a duration contained in a second duration requirement, Ki is an integer greater than 3, and the second duration requirement is a duration requirement based on which the terminal device performs a neighboring-cell non-measurement relaxation; performing the neighboring-cell measurement with a first interval, where the first interval is greater than 1 hour; and stopping the neighboring-cell measurement.

For details, reference can be made to the method embodiment, which will not be repeated here.

Figure 5:
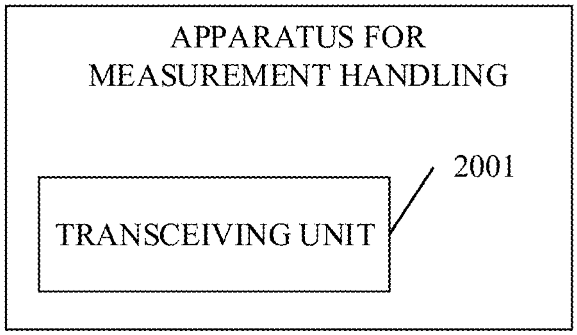
FIG. 5 is a schematic structural diagram of another apparatus for measurement handling provided in the disclosure.

Reference is made to FIG. 5, which is a schematic structural diagram of another apparatus for measurement handling provided in embodiments of the present disclosure. The apparatus for measurement handling may be applied to a network device, optionally, the apparatus for measurement handling may be a network device, an apparatus in the network device, or an apparatus that can be matched with the network device.

The apparatus for measurement handling illustrated in FIG. 5 may include a transceiving unit 2001. The transceiving unit 2001 may be divided into a transmitting unit and a receiving unit. The transmitting unit is configured to implement the transmitting function, and the receiving unit is configured to implement the receiving function The transceiving unit 2001 may implement the transmitting function and/or the receiving function. The transceiving unit may also be described as a communication unit.

The transceiving unit 2001 is configured to send a stationary criterion to the terminal device.

Optionally, the transceiving unit 2001 is further configured to send a not-at-cell-edge criterion to the terminal device. The transceiving unit 2001 is further configured to send the indication information to the terminal device, where the indication information indicates that the terminal device performs the neighboring-cell measurement relaxation when the terminal device satisfies both the stationary criterion and the not-at-cell-edge criterion.

For details, reference can be made to the method embodiment, which will not be repeated here.

Figure 6:
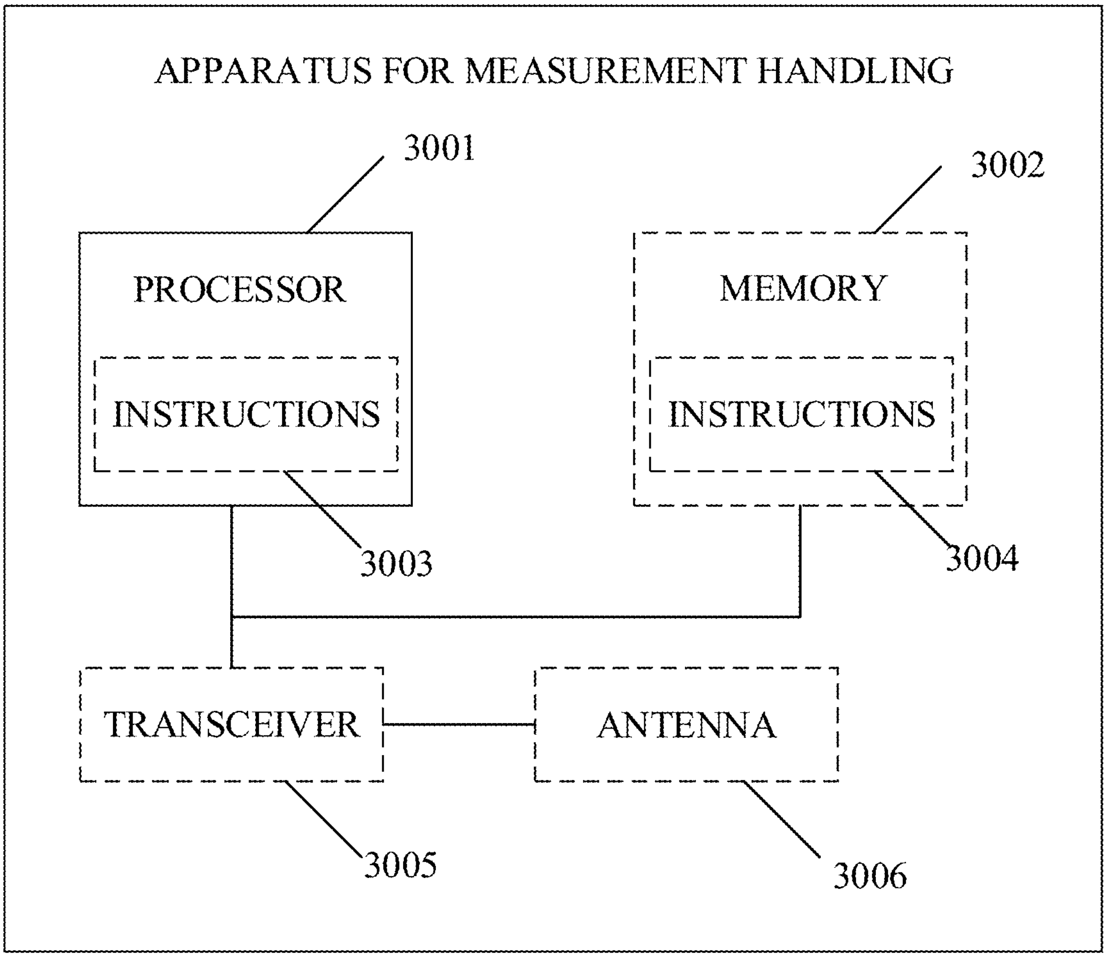
FIG. 6 is a schematic structural diagram of yet another apparatus for measurement handling provided in the disclosure.

FIG. 6 is a schematic structural diagram of an apparatus for measurement handling. The apparatus for measurement handling may be a network device or a terminal device, or the apparatus for measurement handling may be a chip, a chip system, or a processor with which the network device can implement the above method, or the apparatus for measurement handling may be a chip, a chip system, or a processor with which the terminal device can implement the above method. The apparatus may be configured to implement the method described in the above method embodiment, and for details, reference can be made to illustration in the above method embodiment.

The apparatus for measurement handling may include one or more processors 3001. The processor 3001 may be a general processor or a special processor, etc. For example, the processor 3001 may be a baseband processor or a central processing unit. The baseband processor may be configured to process a communication protocol and communication data, and the central processing unit may be configured to control a communication apparatus (such as a base station, a baseband chip, a terminal, a terminal chip, a distributed unit (DU) or a central unit (CU), etc.) to execute software programs and to process software program data.

Optionally, the apparatus for measurement handling may include one or more memories 3002 configured to store a computer program or instructions 3004. The instructions may be run on the processor 3001 to enable the apparatus to perform the method described in the above method embodiment. Optionally, the memory 3002 may also store data. The processor 3001 and memory 3002 may be separated from each other or integrated together.

Optionally, the apparatus for measurement handling may further include a transceiver 3005 and an antenna 3006. The transceiver 3005 may be referred to as a transceiving unit, a transceiver, or a transceiver circuit, etc. and can be configured to implement a transceiving function. The transceiver 3005 may include a receiver and a transmitter. The receiver may be referred to as a receiving device or a receiving circuit, etc. and can be configured to implement a receiving function. The transmitter may be referred to as a transmitting device or a transmitting circuit, etc. and can be configured to implement a transmitting function.

The apparatus for handling may be a terminal device. The processor 3001 is configured to perform the neighboring-cell measurement performed by the terminal device in the above method embodiment. The transceiver 3005 is configured to perform signal transmission and signal reception performed by the terminal device in the above method embodiment.

The apparatus for handling may be a network device. The processor 3001 is configured to perform the internal handling performed by the network device in the above method embodiment. The transceiver 3005 is configured to perform signal transmission and signal reception performed by the network device in the above method embodiment.

In another optional design, the processor 3001 may include or is connected to a transceiver for implementing receiving and transmitting functions.

In yet another possible design, optionally, the processor 3001 may store a computer program or instructions 3003. The computer program or the instructions 3003 runs on the processor 3001 to enable the device to perform the method described in the above method embodiment. The computer program or the instructions 3003 may be solidified in the processor 3001, in this case the processor 3001 may be implemented as a hardware processor.

In yet another possible design, optionally, the memory 3002 may store a computer program or the instructions 3004, the processor 3001 may invoke and run the computer program or the instructions 3004 stored in the memory 3002 to enable the device to perform the method described in the above method embodiment.

In yet another possible design, the apparatus for measurement handling may include a circuit, and the circuit may implement transmitting, receiving, or communication in the above method embodiment. The processor and the transceiver described in the present disclosure can be implemented in an integrated circuit (IC), an analog IC, a radio reference IC (RFIC), a mixed-signal IC, an application specific integrated circuit (ASIC), a printed circuit board (PCB), an electronic device, etc. The processor and transceiver may also be manufactured using various IC processing technologies, such as a complementary metal oxide semiconductor (CMOS), an nMetal-oxide-semiconductor (NMOS), a positive channel metal oxide semiconductor (PMOS), a bipolar junction transistor (BJT), a bipolar CMOS (BiCMOS), silicon germanium (SiGe), and gallium arsenide (GaAs), etc.

The communication device described in the above embodiment may be a network device or a terminal device, but the apparatus for measurement handling described in the present disclosure is not limited in this regard, and the structure of the apparatus for measurement handling may not be limited by FIG. 6. The apparatus for measurement handling may be a stand-alone device or part of a large-scale device. For example, the apparatus for measurement handling may be:

(1) an independent IC, or a chip, or a chip system or subsystem;

(2) a set of one or more ICs, optionally, the IC set may also include a memory for storing data and instructions;

(3) an ASIC, such as a modem (MSM);

(4) a module that can be embedded in other devices;

(5) a receiver, a terminal, an intelligent terminal, a cellular phone, a wireless device, a handheld device, a mobile unit, a vehicle-mounted device, a network device, a cloud device, an artificial intelligence device, etc.;

(6) others and so on.

Figure 7:
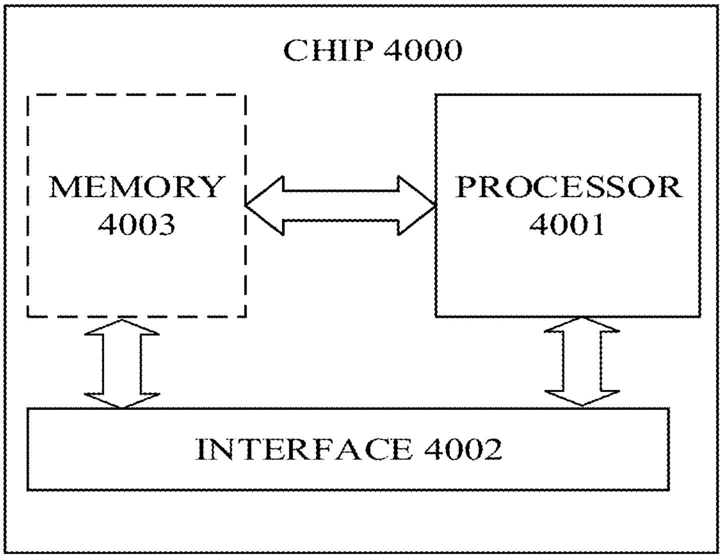
FIG. 7 is a schematic structural diagram of a chip provided in the disclosure.

For the case where the apparatus for measurement handling may be a chip or a chip system, reference can be made to the schematic structural diagram of the chip illustrated in FIG. 7. The chip 4000 illustrated in FIG. 7 includes a processor 4001 and an interface 4002. There may be one or more processors 4001 and one or more interfaces 4002.

For the case where the chip is configured to implement the functions of the terminal device in the embodiments of the present disclosure, the interface 4002 is configured to receive the stationary criterion from the network device.

The processor 4001 is configured to perform the neighboring-cell measurement relaxation when the terminal device satisfies the stationary criterion. The measurement relaxation includes one of the following: performing a neighboring-cell measurement according to a first duration requirement, where a duration contained in the first duration requirement is K2 times a duration contained in a second duration requirement, K2 is an integer greater than 3, and the second duration requirement is a duration requirement based on which the terminal device performs a neighboring-cell non-measurement relaxation; performing the neighboring-cell measurement with a first interval, where the first interval is greater than 1 hour; and stopping the neighboring-cell measurement.

Optionally, the chip further includes a memory 4003. The memory 4003 is configured to store necessary program instructions and data for the terminal device.

For the case where the chip is configured to implement the functions of the network device in the embodiments of the present disclosure, the interface 4002 is configured to send the stationary criterion to the terminal device.

Optionally, the chip further includes the memory 4003. The memory 4003 is configured to store necessary program instructions and data for the network device.

A person skilled in the art may further learn that various illustrative logical blocks and operations illustrated in the embodiments of the present disclosure may be implemented by electronic hardware, computer software, or a combination thereof. Whether a function is implemented by hardware or software depends on specific applications and the design of the overall system. For each specific application, a person skilled in the art may use various methods to implement the functions described herein, but such implementation should not be understood as beyond the scope of protection of embodiments of the present disclosure.

The present disclosure further provides a computer-readable storage medium configured to store a computer program. The computer-readable storage medium is executable by a computer to enable the computer to implement the function of any of the above method embodiments.

The present disclosure further provides a computer program product. The computer program product is executable by a computer to enable the computer to implement the function of any of the above method embodiments.

The above embodiments may be implemented wholly or partly through software, hardware, firmware, or any combination thereof. When implemented through software, the embodiments may be implemented in whole or in part in the form of a computer program product. The computer program product includes one or more computer instructions. When the computer instructions are loaded and executed on the computer, the computer implements the process or function of the embodiments of the present disclosure in whole or in part. The computer may be a general computer, a special purpose computer, a computer network, or other programmable devices. The computer instructions may be stored in a computer-readable storage medium, or transmitted from one computer-readable storage medium to another computer-readable storage medium, for example, the computer instructions may be transmitted from a website site, computer, server, or data center to another website site, computer, server, or data center in a wired manner (e.g., a coaxial cable, an optical fiber, a digital subscriber line (DSL)) or a wireless manner (e.g., infrared, wireless, microwave, etc.). The computer-readable storage medium may be any usable medium that the computer can access, or a data storage device such as a server or data center that integrates one or more available medium. The available medium may be a magnetic medium (e.g., a floppy disk, a hard disk, or a magnetic tape), an optical medium (e.g., a high-density digital video disc (DVD)), or a semiconductor medium (e.g., solid state disk (SSD)) and the like.

An ordinary person skilled in the art may understand that the numerical numbers such as the first and the second involved in the present disclosure are only for the convenience of illustration, and do not constitute a limitation on the scope of embodiments of the present disclosure, and may indicate order.

The correspondence illustrated in the tables in the present disclosure may be configured or may be predefined. Values in each table are only examples and can be configured as other values, which is not limited in the present disclosure. When the correspondence between information and parameters is configured, it is not necessarily required to configure all the correspondence illustrated in each table. For example, in the table in the present disclosure, correspondence illustrated in certain lines may not be configured. For example, appropriate adjustments can be made based on the above tables, such as splitting and merging. The names of the parameters illustrated in the headings of the above tables may be replaced by other names that can be understood by the communication device, and the values or representations of the parameters may be replaced by other values or representations that can be understood by the communication device. The above tables may be implemented with other data structures, such as an array, a queue, a container, a stack, a linear table, a pointer, a linked list, a tree, a graph, a structure, a class, a heap, or a hash table.

The "predefined" in the present disclosure may be understood as defining, predefined, stored, pre-stored, pre-negotiated, preconfigured, solidification, or pre-burning.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method implementations, which will not be repeated herein.

The above illustrations merely illustrate detailed embodiments of the disclosure, but are not intended to limit the scope of protection of the disclosure. Any variation or replacement readily figured out by a person skilled in the art within the technical scope disclosed in the disclosure shall belong to the scope of protection of the disclosure. Therefore, the scope of protection of the present disclosure shall be subject to the scope of protection of the claims.

What is claimed is:

1. A method for measurement handling, the method being executed by a terminal device and comprising:

receiving a stationary criterion from a network device; and performing a neighboring-cell measurement relaxation when the terminal device satisfies the stationary criterion;

wherein the neighboring-cell measurement relaxation comprises:

performing a neighboring-cell measurement according to a first duration requirement, a duration contained in the first duration requirement being Ki times a duration contained in a second duration requirement, Ki being an integer greater than 3, and the second duration requirement being a duration requirement based on which the terminal device performs a neighboring-cell non-measurement relaxation.

2. The method of claim 1, wherein each of the first duration requirement and the second duration requirement contains one or more of: a duration for cell detection, a duration for cell measurement, and a duration for cell evaluation.

3. The method of claim 1, wherein when the terminal device determines that the terminal device satisfies the stationary criterion, before performing the neighboring-cell measurement relaxation, the method further comprises:

determining whether a signal of a serving cell where the terminal device camps satisfies an intra-frequency measurement condition;

performing the neighboring-cell measurement relaxation when the terminal device satisfies the stationary criterion comprises:

performing an intra-frequency-neighboring-cell measurement relaxation when the signal of the serving cell where the terminal device camps satisfies the intra-frequency measurement condition and the terminal device satisfies the stationary criterion.

4. The method of claim 1, wherein when the terminal device satisfies the stationary criterion, before performing the neighboring-cell measurement relaxation, the method further comprises:

determining whether a signal of a serving cell where the terminal device camps satisfies an inter-frequency measurement condition;

performing the neighboring-cell measurement relaxation when the terminal device satisfies the stationary criterion comprises:

performing an inter-frequency-neighboring-cell measurement relaxation when the signal of the serving cell where the terminal device camps satisfies the intra-frequency measurement condition and the terminal device satisfies the stationary criterion.

5. The method of claim 4, wherein the first duration requirement and the second duration requirement are both duration requirements for an inter-frequency measurement.

6. The method of claim 1, further comprising:

receiving a not-at-cell-edge criterion from the network device; and receiving indication information from the network device, wherein the indication information indicates that the terminal device performs the neighboring-cell measurement relaxation when the terminal device satisfies both the stationary criterion and the not-at-cell-edge criterion;

performing the neighboring-cell measurement relaxation when the terminal device satisfies the stationary criterion comprises:

performing, based on the indication information, the neighboring-cell measurement relaxation when the terminal device satisfies both the stationary criterion and the not-at-cell-edge criterion.

7. The method of claim 6, wherein the not-at-cell-edge criterion comprises at least one of a first not-at-cell-edge criterion or a second not-at-cell-edge criterion, and a parameter value contained in the second not-at-cell-edge criterion is lower than a parameter value contained in the first not-at-cell-edge criterion.

8. The method of claim 7, wherein the not-at-cell-edge criterion comprises the first not-at-cell-edge criterion;

the indication information indicates that the terminal device performs the neighboring-cell measurement relaxation when the terminal device satisfies both the stationary criterion and the first not-at-cell-edge criterion.

9. A terminal device, comprising:

a transceiver;

a processor coupled to the transceiver; and a memory storing a computer program;

wherein the computer program, when executed by the processor, causes the terminal device to:

receive a stationary criterion from a network device; and perform a neighboring-cell measurement relaxation when the terminal device satisfies the stationary criterion;

wherein the neighboring-cell measurement relaxation comprises:

performing a neighboring-cell measurement according to a first duration requirement, a duration contained in the first duration requirement being Ki times a duration contained in a second duration requirement, Ki being an integer greater than 3, and the second duration requirement being a duration requirement based on which the terminal device performs a neighboring-cell non-measurement relaxation.

10. The terminal device of claim 9, wherein each of the first duration requirement and the second duration requirement contains one or more of: a duration for cell detection, a duration for cell measurement, and a duration for cell evaluation.

11. The terminal device of claim 9, wherein the computer program is executed by the processor to further cause the terminal device to:

determine whether a signal of a serving cell where the terminal device camps satisfies an intra-frequency measurement condition; and perform an intra-frequency-neighboring-cell measurement relaxation when the signal of the serving cell where the terminal device camps satisfies the intra-frequency measurement condition and the terminal device satisfies the stationary criterion.

12. The terminal device of claim 9, wherein the computer program is executed by the processor to further cause the terminal device to:

determine whether a signal of a serving cell where the terminal device camps satisfies an inter-frequency measurement condition; and perform an inter-frequency-neighboring-cell measurement relaxation when the signal of the serving cell where the terminal device camps satisfies the inter-frequency measurement condition and the terminal device satisfies the stationary criterion.

13. The terminal device of claim 12, wherein the first duration requirement and the second duration requirement are both duration requirements for an inter-frequency measurement.

14. The terminal device of claim 9, wherein the computer program is executed by the processor to further cause the terminal device to:

receive a not-at-cell-edge criterion;

receive an indication information from the network device, wherein the indication information indicates that the terminal device performs the neighboring-cell measurement relaxation when the terminal device satisfies both the stationary criterion and the not-at-cell-edge criterion; and perform, based on the indication information, the neighboring-cell measurement relaxation when the terminal device satisfies both the stationary criterion and the not-at-cell-edge criterion.

15. The terminal device of claim 14, wherein the not-at-cell-edge criterion comprises at least one of a first not-at-cell-edge criterion or a second not-at-cell-edge criterion, and a parameter value contained in the second not-at-cell-edge criterion is lower than a parameter value contained in the first not-at-cell-edge criterion.

16. A network device, comprising:

a transceiver;

a processor coupled to the transceiver; and a memory storing a computer program;

wherein the computer program, when executed by the processor, causes the network device to:

send a stationary criterion to a terminal device, a neighboring-cell measurement relaxation being performed by the terminal device when the terminal device satisfies the stationary criterion;

wherein the neighboring-cell measurement relaxation comprises:

performing a neighboring-cell measurement according to a first duration requirement, a duration contained in the first duration requirement being Ki times a duration contained in a second duration requirement, Ki being an integer greater than 3, and the second duration requirement being a duration requirement based on which the terminal device performs a neighboring-cell non-measurement relaxation.

17. The network device of claim 16, wherein the computer program is executed by the processor to further cause the network device to:

send a not-at-cell-edge criterion to the terminal device; and send an indication information to the terminal device, wherein the indication information indicates that the terminal device performs the neighboring-cell measurement relaxation when the terminal device satisfies both the stationary criterion and the not-at-cell-edge criterion.

18. The network device of claim 17, wherein the not-at-cell-edge criterion comprises at least one of a first not-at-cell-edge criterion or a second not-at-cell-edge criterion, and a parameter value contained in the second not-at-cell-edge criterion is lower than a parameter value contained in the first not-at-cell-edge criterion.

19. The network device of claim 16, wherein each of the first duration requirement and the second duration requirement contains one or more of: a duration for cell detection, a duration for cell measurement, and a duration for cell evaluation.

* * * * *